US007610604B2

United States Patent
Lee et al.

(10) Patent No.: US 7,610,604 B2
(45) Date of Patent: Oct. 27, 2009

(54) INTELLIGENT MPEG MEDIA STORAGE, EXECUTION, AND PRESENTATION SYSTEM USING NETWORK STORAGE SYSTEM

(75) Inventors: Kuo Chu Lee, Princton Jct., NJ (US); Hasan Timucin Ozdemir, Plainsboro, NJ (US); Lipin Liu, Belle Mead, NJ (US)

(73) Assignee: Panasonic Corporation, Osaka (JP)

( * ) Notice: Subject to any disclaimer, the term of this patent is extended or adjusted under 35 U.S.C. 154(b) by 1076 days.

(21) Appl. No.: 11/058,525

(22) Filed: Feb. 15, 2005

(65) Prior Publication Data

US 2006/0182102 A1 Aug. 17, 2006

(51) Int. Cl.
*H04N 7/173* (2006.01)

(52) U.S. Cl. ............................ 725/92; 725/115; 386/46; 386/125

(58) Field of Classification Search .................... 725/91, 725/92, 96, 97, 114, 115, 116, 117; 370/389, 370/401; 709/223, 217, 219; 711/3, 112, 711/203, 154; 386/46, 125

See application file for complete search history.

(56) References Cited

U.S. PATENT DOCUMENTS

| 7,010,660 B2 * | 3/2006 | Mimatsu et al. ............. 711/170 |
| 7,159,233 B2 * | 1/2007 | Son et al. ...................... 725/86 |
| 7,484,055 B1 * | 1/2009 | Gupta et al. ................. 711/156 |
| 2002/0199205 A1 * | 12/2002 | Sonawane et al. ........... 725/115 |
| 2003/0086023 A1 * | 5/2003 | Chung et al. ................. 348/714 |
| 2004/0054656 A1 * | 3/2004 | Leung et al. .................... 707/1 |

* cited by examiner

*Primary Examiner*—Andrew Y Koenig
*Assistant Examiner*—Aklil Tesfaye
(74) *Attorney, Agent, or Firm*—Harness, Dickey & Pierce, PLC

(57) ABSTRACT

A resource manager transforms the MPEG7 descriptors into an active and composite storage, processing, and presentation component in a storage area network (e.g. iSCSI). The active component can enable fast search and retrival operation directly on the logical disk blocks which maps well with the multimedia video stream and images data. It can also support content addressable search on the video and image files and play the media blocks directly. In addition, it enables a dynamic configuration of a media processing function after it is loaded in an execution environment. The data block is moved from the iSCSI interface directly into processing modules and presentation modules via decoder, buffer, and constraint control units.

29 Claims, 3 Drawing Sheets

INTELLIGENT MPEG MEDIA STORAGE, EXECUTION, AND PRESENTATION SYSTEM USING NETWORK STORAGE SYSTEM

FIELD OF THE INVENTION

The present invention generally relates to network storage systems, and relates in particular to use of a network storage system to accomplish an intelligent and high performance MPEG media storage, execution, and presentation system.

BACKGROUND AND SUMMARY OF THE INVENTION

Conventional file systems do not record the context needed to search multimedia files based on the contents of the media. One important objective of MPEG7 is to provide a descriptor definition for meta data and content framework to facilitate content based search for multimedia data. While MPEG7 defines the descriptor, it does not specify the implementation of MPEG7 as a total storage system. With the advance of an iSCSI protocol which supports IP based storage area networks, integration of an MPEG7 descriptor with the iSCSI protocol can provide a location transparent data access interface for a distributed application to share multimedia data without having to write complex, distributed, communication codes in the application and file systems.

In accordance with the present invention, a resource manager transforms the MPEG7 descriptors into an active and composite storage, processing, and presentation component in a storage area network (e.g, iSCSI). The active component can enable a dynamic configuration of a media processing function after it is loaded in an execution environment. The data block is moved from the iSCSI interface directly into processing modules and presentation modules via decoder, buffer, and constraint control units.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
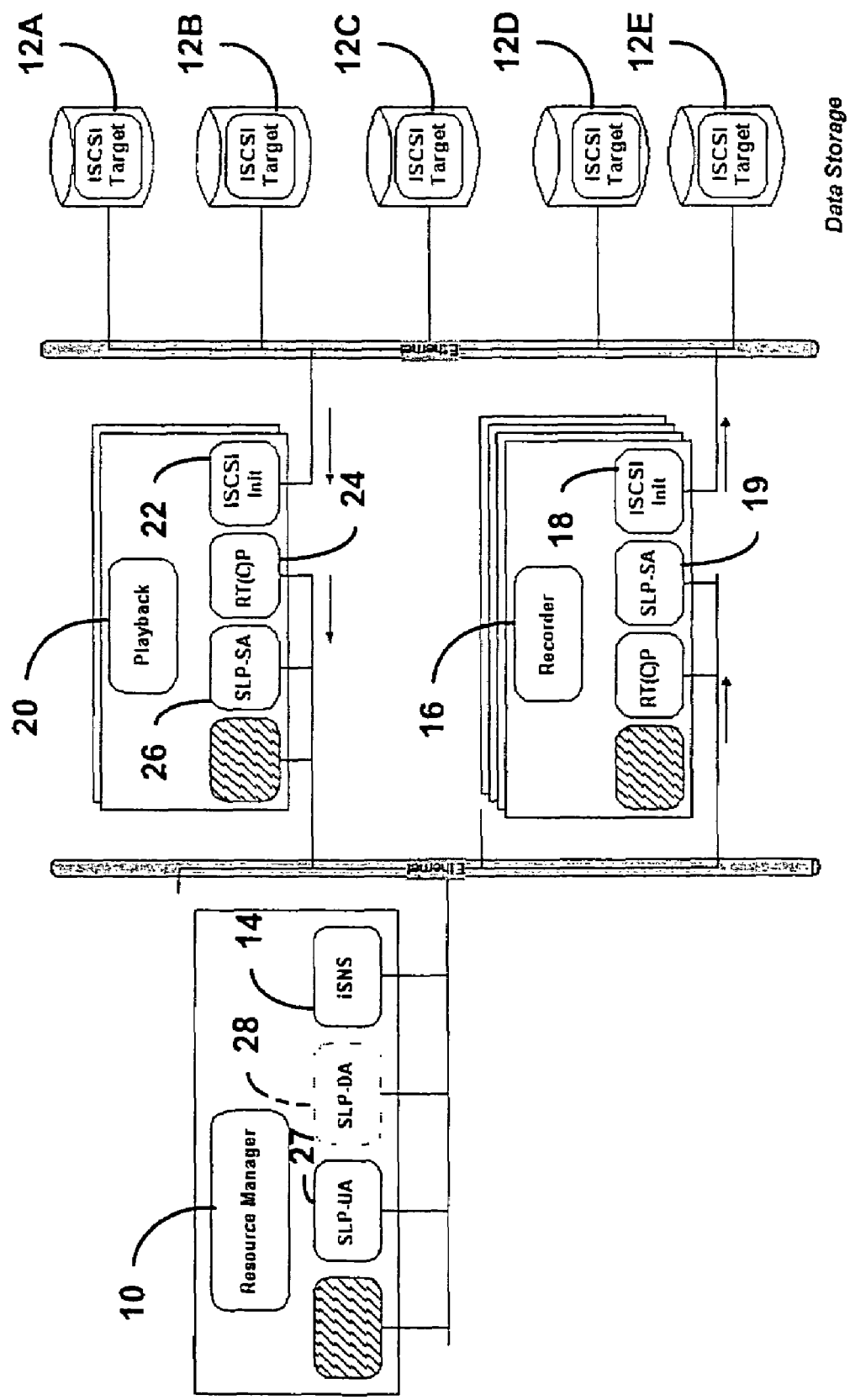
FIG. 1 is a block diagram of an intelligent MPEG media storage, execution, and presentation system in accordance with the present invention.

Referring to FIG. 1, the intelligent MPEG media storage, execution, and presentation system in accordance with the present invention includes a resource manager 10 that discovers the available iSCSI Targets 12A-12E from iSNS Notification mechanism by observing device Reg and Unreg events for iSCSI Targets 12A-12E. The issue is to obtain device specific information about the capacity, etc. when iSCSI Targets 12A-12E register to iSNS server 14.

Recorder Unit 16 handles the concurrent recording sessions. Instead of writing to local hard disk, the iSCSI Initiator 18 is used to store the data on the iSCSI Targets 12A-12E. Resource Manager 10 instructs the Recorder Unit 16 to record which RT(C)P over UDP flow to where (iSCSI Target). The media data is temporarily buffered in the recorder controller and eventually moved to the recorder using the iSCSI initiator interface. Recorder Unit 16 registers itself to a directory in resource manger 10 via Service Location Protocol—Service Agent (SLP-SA) 19. This registration contains the service type definition.

Playback Unit 20 handles the concurrent playback operations. The data is fetched from iSCSI Initiator interface 22 and sent through the RTP over UDP interface 24. Resource Manager 10 instructs the Playback Unit 20 from where to start reading and to where to send the RTP packets. Playback Unit 20 registers itself via SLP-SA 26 and contains the service type definition.

Resource Manager 10 interacts with the SLP layer with User Agent interface 27 and Directory Agent Interface 28 to receive the Recorder Unit 16 and Playback Unit 20 registrations. Resource Manager 10 discovers the iSCSI Targets 12A-12E from iSNS server 14. In this respect, Resource Manager 10 behaves as a Storage Manager Service. Meta-data about the MPEG media data block placement are stored in extended MPEG-7 definition on OpenLDAP (XML2RDBMS mapping) for location information. This meta-data contains the content creation descriptors as well as the block layout of the media data on iSCSI Targets 12A-12E.

Instead of creating layers of file system and IP layer protocols, the iSCSI mapped disk partition is modeled by Resource Manager 10 using a content addressable MPEG descriptor. The mpeg descriptor provides all the information needed about locating the block of storage. For example, SCSI mapped disk blocks may contain MPEG 2 and/or mpeg4 streams. In this case, the Resource Manager 10 can allocate a special partition to store the MPEG 7 descriptors. The descriptor blocks are designed to provide fast access to blocks of media blocks stored in the disk partition mapped from the iSCSI The system supports two types of search. A first type of search is based on identification of the recorded media stream. A second type of search is based on features extracted from the content of the media and stored in the MPEG7 descriptor. The second type of search is referred to herein as "MPEG7 assisted content addressable search." Example features include: (a) creator of the media content; (b) time of creation; (c) place of creation; (d) special features such as person, face, car, and color of objects; and (e) relationship between the objects defined in MPEG7 descriptor.

Figure 2A:
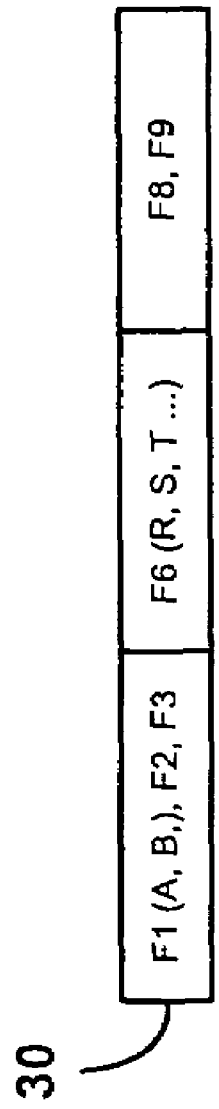
FIGS. 2A-2C are block diagrams of meta descriptor storage blocks in accordance with the present invention.
Figure 2B:
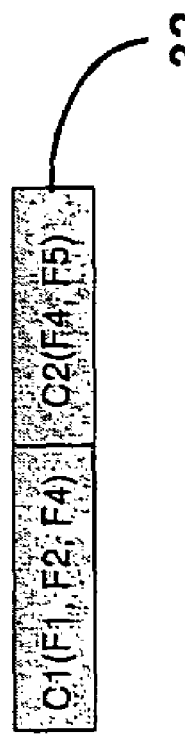
Figure 2C:
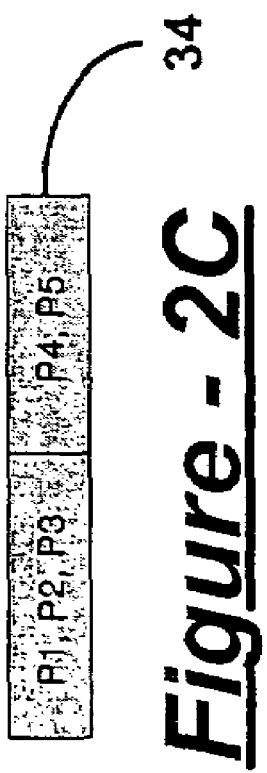

Turning now to FIG. 2, the meta descriptor blocks have various functions. For example, there can be a function block tag 30 (FIG. 2A), a constraint block tag 32 (FIG. 2B), and a data placement head pointer block tag 34 (FIG. 2C). Function block tags can contain identifiers for retrieval, decoder, and play to screen functions as further explained below. In an XML format, a constraint block tag may contain three sub-tags, each having a function pointer for synchronizing functions identified by the function block tags. Data placement block tags can contain a logical disk block ID that can be used to access the data blocks in the disk.

The most basic function is to represent a description of a tree structured XML file containing composite MPEG7 contents with additional media playback control and physical mapping of data blocks. For example, the meta descriptor block in FIG. 2A contains a set of function descriptors, F1( ), F2( ), F3( ), and F8( ), that can be loaded into an execution unit. A function may have parameters to specify input and output of the function which can be used to define connection between the functions. A function may also be a simple reference function that contains a pointer to data blocks to be retrieved. This function can simply specify one or more data blocks to be retrieved. A function can specify data blocks to be retrieved plus a decoder for decoding the data blocks and/or a target screen to which the data blocks are to be played back. The execution unit stores the code that can be linked with the dynamically loaded meta function descriptors.

Another type of control descriptor is a constraint descriptor. A constraint descriptor contains an execution relationship of a set of function descriptors. A constraint descriptor, such as the example in FIG. 2B, contains constraints C1(F1( ), F2(2), F3( )) and C2(F4( ), F5( )). For example, C1 can specify that a set of functions F1, F2, and F3 are to be concatenated to perform a pipelined process. C2 can specify a simultaneous execution of function F4 and F5 to display media in two separate windows.

A further type of descriptor is a data placement descriptor as shown in FIG. 2C, which contains one or more pointers to a list of logical disk block IDs. The structure of the list of logical disk block ID is implementation dependent; therefore, is not listed here.

To playback a set of composite content, a constraint descriptor is first loaded into a constraint execution unit. Then, depending on the relationship specified in the constraint descriptor, a function descriptor is loaded into the execution unit. The meta descriptor block can be stored in XML files or other efficient storage mechanisms, such as a multi-list. The media blocks are stored in logical disk blocks directly using the data placement mapping blocks to achieve high speed processing and random access to data blocks. The function execution unit can retrieve and operate on the logical data block directly without using a file system. In this case, the function execution unit has a direct iSCSI interface to the disk block to allow for fast media storage and retrieval. The constraint control descriptor provides synchronization as required between two parallel execution function blocks to support synchronized display among multiple video streams.

Figure 3:
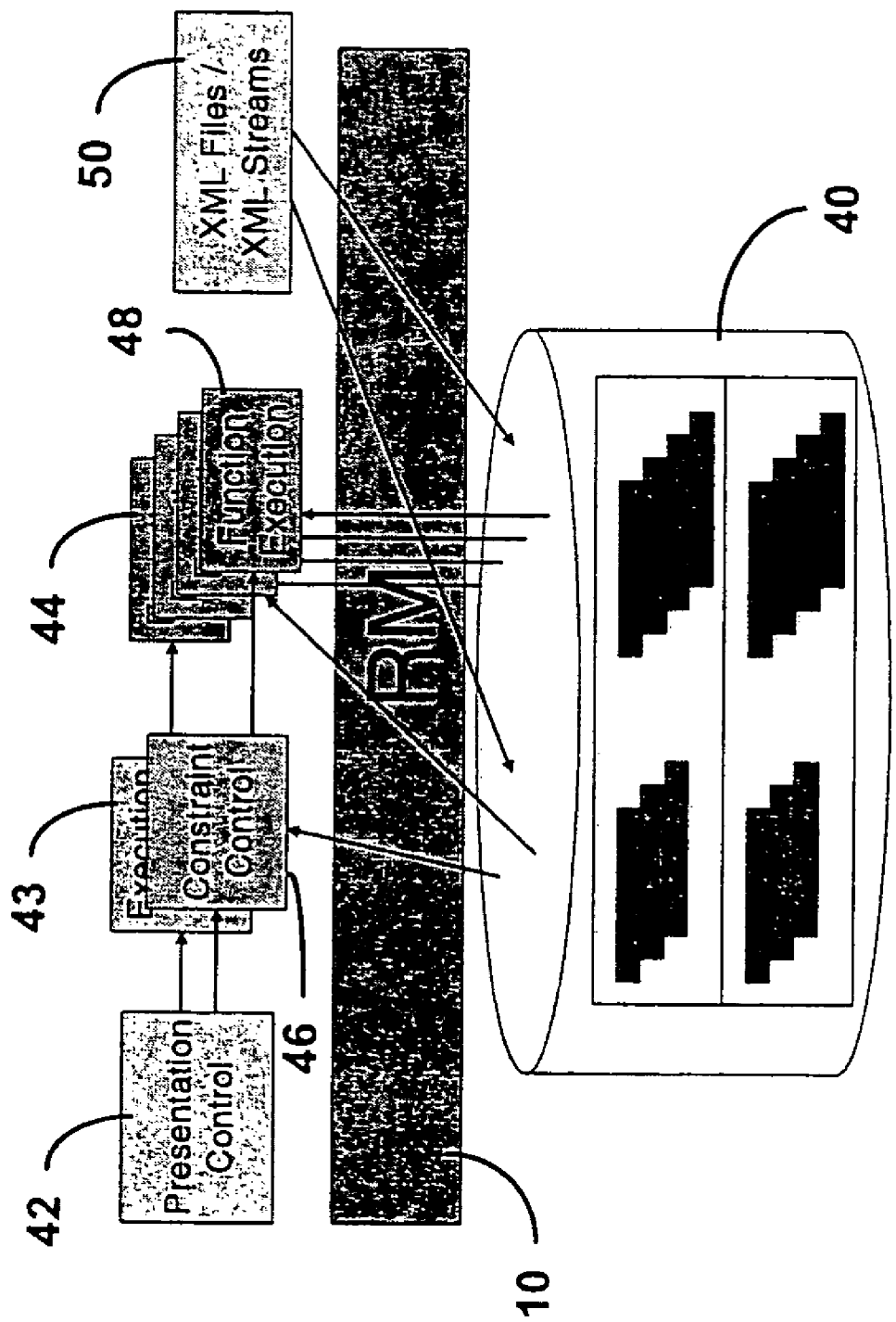
FIG. 3 is a block diagram of an execution environment employing the MPEG media storage, execution, and presentation system and the metadata descriptors according to the present invention.

With the Meta Data Descriptor, a complex multimedia presentation is stored in a form that is efficient in the iSCSI disk and can be accessed directly without going through a conventional file system. Turning now to FIG. 3, a presentation is a set of MPEG7 descriptors stored and retrieved from the iSCSI disk partitions. There is a mapping of data blocks based on the placement function. MPEG-7 based XML files are converted into a set of meta descriptors. The meta descriptor is stored in iSCSI blocks based on the set of placement functions. The placement functions allocate iSCSI block and place the meta descriptor and media into the physical blocks. Then, the placement functions create a set of index descriptors stored in the disk 40.

To retrieve a presentation, a presentation control unit 42 employs resource manager 10 to reference an index descriptor to find a meta descriptor block. From the meta descriptor block, a constraint control descriptor 46 is loaded into the constraint execution unit 43. Then an execution function 48 (e.g. retrieve, decode, and play to screen functions) identified by the meta descriptor block is retrieved and loaded into the execution units 44. After execution function 48 is loaded into the execution units 44, the presentation control unit 42 initiates the constraint control unit 43 to execute the function 48 loaded in the execution units 44. In this case, the decoder gets the data from the retrieve function, and passes decoded data to the play to screen function. The presentation control unit 48 can interact with a user through a user interface or through a stored program control.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An intelligent MPEG media storage, execution, and presentation system, comprising:
   a distributed resource manager that discovers available storage area network targets based on a storage area network notification mechanism by observing device registration and deregistration events for the storage area network targets, said resource manager managing placement of MPEG media data using feature parameters that are dynamically extracted from the media data to provide content addressable media placement and positioning information;
   a plurality of distributed recorder units that handle concurrent recording sessions by using a storage area network initiator to store data on the storage area network targets, said recorder units receiving the information from said resource manager and recording the media data to the storage area network targets in accordance with the information;
   a plurality of playback units that handle concurrent playback operations by looking up the information in the resource manager and by fetching the media data from a storage area network initiator interface and sending the media data through an RTP interface, wherein said resource manager instructs said playback unit from where to start reading and to where to send RTP packets; and
   said resource manager models a storage area network disk partition by using a content addressable MPEG descriptor that provides information needed to locate a block of storage based on contents of the block of storage.

2. The system of claim 1, wherein said resource manager interacts with a SLP layer, a user agent interface, and a directory agent interface to receive registrations of said recorder unit and said playback unit.

3. The system of claim 1, wherein said resource manager discovers storage area network targets from an iSNS server, thereby behaving as a storage manager service, wherein meta-data about files are stored in MPEG-7 definition on OpenLDAP (XML2RDBMS mapping) for file information, and the meta-data contains content creation descriptors as well as block layout of a file on a storage area network target.

4. The system of claim 1, wherein meta descriptor blocks provide one or more of a set of functions or parameters plus references to methods for decoding encoded media.

5. The system of claim 4, wherein the decoding methods are capable of being loaded into hardware to provide performance needed to decode the encoded media.

6. The system of claim 1, wherein meta descriptor blocks provide a set of constraint control blocks describing how media data is to be processed between function units.

7. The system of claim 6, wherein constraints provided by the constraint control blocks specify rate and buffer between function units plus time synchronization between parallel execution functions.

8. The system of claim 1, wherein meta descriptor blocks provide a set of data placement functions to optimize function blocks and function interconnect blocks.

9. The system of claim 8, wherein the placement function enables fast insertion and retrieval based on each application, rather than being restricted to a specific file system.

10. A media storage system, comprising:
a resource manager that discovers available storage area network targets based on a storage area network notification mechanism by observing device registration and deregistration events for the storage area network targets, said resource manager managing placement of MPEG media data using feature parameters that are dynamically extracted from the media data to provide content addressable media placement and positioning information, wherein said resource manager models a storage area network disk partition by using a content addressable MPEG descriptor that provides information needed to locate a block of storage; and
a recorder unit that using a storage area network initiator to store media data on a storage area network target, said recorder unit receiving the information from said resource manager and recording the media data to the storage area network target in accordance with the information.

11. The system of claim 10, wherein said resource manager interacts with an SLP layer, a user agent interface, and a directory agent interface to receive registrations of said recorder unit and said playback unit.

12. The system of claim 10, wherein said resource manager discovers storage area network targets from an iSNS server, thereby behaving as a storage manager service, wherein meta-data about files are stored in MPEG-7 definition on OpenLDAP (XML2RDBMS mapping) for file information, and the meta-data contains content creation descriptors as well as block layout of a file on a storage area network target.

13. The system of claim 10, wherein meta descriptor blocks provide a set of functions or parameters plus references to methods for decoding encoded media.

14. The system of claim 13, wherein the decoding methods are capable of being loaded into hardware to provide necessary performance needed to decode the encoded media.

15. The system of claim 10, wherein meta descriptor blocks provide a set of constraint control blocks describing how media data is to be processed between function units.

16. The system of claim 15, wherein constraints provided by the constraint control blocks specify rate, synchronization, and buffer between function units.

17. The system of claim 10, wherein meta descriptor blocks provide a set of data placement functions to optimize function blocks and function interconnect blocks.

18. The system of claim 17 wherein the placement function enables fast insertion and retrieval based on each application, rather than being restricted to a specific file system.

19. A presentation system, comprising:
a distributed resource manager that discovers available storage area network targets based on a storage area network notification mechanism by observing device registration and deregistration events for the storage area network targets, said resource manager managing placement of MPEG media data using feature parameters that are dynamically extracted from the media data to provide content addressable media placement and positioning information;
a presentation control unit employs said resource manager to reference an index descriptor stored in a storage area network to find a meta descriptor block by using a content addressable MPEG descriptor that provides information to locate a block of storage based on the content of the block of storage; and
a playback unit that looks up the information in the resource manager and by fetching the media data from a storage area network initiator interface and sending the media data through an RTP interface, wherein said resource manager instructs said playback unit from where to start reading and to where to send RTP packets.

20. The system of claim 19, wherein said presentation control unit retrieves a decoding function based on the meta descriptor block and loads the decoding function into one of a plurality of execution units.

21. The system of claim 20, wherein said presentation control unit loads a constraint function block of the meta descriptor block into a constraint execution control unit.

22. The system of claim 21, wherein said presentation control unit, after loading of said execution units, provides control to said constraint execution control unit to play media by controlling said execution units.

23. The system of claim 19, wherein said presentation control unit interacts with a user through a user interface.

24. The system of claim 19, wherein said presentation control unit interacts with a user through a stored program control.

25. A playback system, comprising:
a presentation control unit that looks up predefined content addressable media placement and positioning information by referencing an index descriptor stored in a storage area network to find a meta descriptor block;
a plurality of function execution units that fetch media data from a storage area network initiator interface based on the information and sends the media data through an RTP interface, wherein said presentation control unit retrieves a decoding function based on the meta descriptor block and loads the decoding function into one of the said execution units by using a content addressable MPEG descriptor that provides information to locate a block of storage based on the content of the block of storage; and
a constraint execution control unit that synchronizes operation of said execution units.

26. The system of claim 25, wherein said presentation control unit retrieves a media data retrieval function based on the meta descriptor block and loads the media data retrieval function into one of said execution units.

27. The system of claim 25, wherein said presentation control unit retrieves a play to screen function based on the meta descriptor block and loads the play to screen function into one of said execution units.

28. The system of claim 27, wherein said presentation control module loads a constraint function block of the meta descriptor block into said constraint execution control unit.

29. The system of claim 28, wherein said presentation control unit, after loading of said execution units, provides control to said constraint execution control unit to play media by controlling said execution units to retrieve, decode, and display media data in a synchronous manner.

* * * * *